United States Patent [19]

Matsuoka et al.

[11] Patent Number: 4,855,124
[45] Date of Patent: Aug. 8, 1989

[54] PROCESS FOR THE DESULFURIZATION OF GAS CONTAINING HYDROGEN SULFIDE

[75] Inventors: Hiroo Matsuoka, Ebina; Tsutomu Toida; Takao Takinami, both of Handa City; Senji Takenaka, Yokosuka; Tetsuo Fujita, Kawasaki, all of Japan

[73] Assignee: JGC Corporation, Tokyo, Japan

[21] Appl. No.: 117,908

[22] Filed: Nov. 4, 1987

Related U.S. Application Data

[63] Continuation of Ser. No. 837,353, Mar. 7, 1986, abandoned.

[30] Foreign Application Priority Data

Mar. 8, 1985 [JP] Japan .................................. 60-44587
Jul. 4, 1985 [JP] Japan ................................. 60-145844

[51] Int. Cl.$^4$ ...................... C01B 17/05; C01B 17/54
[52] U.S. Cl. .................................. 423/574 L; 423/543
[58] Field of Search ........................ 423/543, 574 L

[56] References Cited

U.S. PATENT DOCUMENTS 1,925,198 9/1933 Meluill .............................. 423/574 L
2,043,084 6/1936 Ward et al. ....................... 423/574 L
2,534,063 12/1950 Ross et al. ........................ 423/574 L

FOREIGN PATENT DOCUMENTS 71078 9/1983 European Pat. Off. ............ 423/543

Primary Examiner—John Doll
Assistant Examiner—Jeffrey E. Russel
Attorney, Agent, or Firm—Cushman, Darby and Cushman

[57] ABSTRACT

It has been believed that the Claus reaction in water without additive gives no more than very low conversion and some additive such as buffer or catalyst must be used to attain satisfactory H$_2$S conversion.

However, it was discovered that when H$_2$S and SO$_2$ are introduced in water simultaneously and continuously for hours, the conversion increased gradually and became steady at high level. The present invention was accomplished based on this inventive knowledge.

9 Claims, 3 Drawing Sheets

PROCESS FOR THE DESULFURIZATION OF GAS CONTAINING HYDROGEN SULFIDE

This is a continuation of application Ser. No. 837,353, filed Mar. 7, 1986, which was abandoned upon the filing hereof.

FIELD OF THE INVENTION

This invention relates to a process for the selective desulfurization of gas containing hydrogen sulfide ($H_2S$) by liquid phase Claus reaction.

DESCRIPTION OF THE PRIOR ART

The Claus reaction in which hydrogen sulfide ($H_2S$) and sulfur dioxide ($SO_2$) react to produce elemental sulfur in accordance with the following equation (1) has been heretofore widely used for the desulfurization of gases containing $H_2S$.

$$2H_2S + SO_2 = 3S + 2H_2O \qquad (1)$$

For example, a low concentration of $H_2S$ in a gas is absorbed with an absorbent such as monoethanol amine, and concentrated $H_2S$ desorbed from the absorbent is subjected to reaction with $SO_2$ gas in two reaction stages, namely, at first without a catalyst at atmospheric pressure and higher temperature and then with a catalyst at atmospheric pressure and a relatively lower temperature. Elemental sulfur formed thus is recovered. Such a gas phase Clause reaction is most preferably used in industry.

On the other hand, as the Clause reaction in liquid phase is expected to be carried out at a lower temperature, various methods have been recently started.

As for the liquid phase Clause process, reactions which are conducted in water without addition have been examined earlier, but it is known that $H_2S$ was hardly eliminated thereby. The reason this can be explained in that $H_2S$ and $SO_2$ do not react efficiently even if they are charged in water simultaneously, due to differences in dissolving rate of the respective component.

This phenomenon was confirmed by the following experiment conducted by the inventors of the present invention.

A gas containing 2,500 ppm of $SO_2$ and 5,000 ppm of $H_2S$ (the rest was $N_2$), was charged into an absorbing reactor filled with only water and maintained at 40 $Kg/cm^2G$. However, it was observed that outlet gas from the reactor contained 4,000 ppm of $H_2S$, meaning that almost no absorption nor reaction was accomplished involving $H_2S$.

In order to increase the solubility of these components, it is desirable to use basic aqueous medium.

However, because colloidal sulfur is a radiation product which is difficult to be separated from the system and other by-products are apt to be produced at high pH condition, it is recommended to use an appropriate buffer solution or catalysts having a buffer function to keep pH of the aqueous medium from 4 to 5.

Therefore, research concerning a liquid phase Clause reaction has involved the consideration the selection of an effective buffer.

For example;

(a) Japanese Patent Public Disclosure Tokkai Sho 48-79789 (1973) shows a process in which $H_2S$ and $SO_2$ are introduced simultaneosuly or one after another into a Brensted basic solution containing an inorganic anion having double-bond oxygen radical(s) such as alkali metal borate or alkali metal phosphate.

(b) Japanese Patent Publication Tokko Sho 52-28113 (1977) shows a process in which $H_2S$ is contacted to an aqueous absorbent of pH 3-7 containing similar compound(s) as used in (a) and $SO_2$ at a pressure preferably 2-10 atm., then sulfur is separated.

(c) Japanese Patent Public Disclosure Tokkai Sho 59-207808 (1984) shows a process in which $SO_2$ is first absorbed in an aqueous solution of phosphate, citrate, etc., and then a gas containing $H_2S$ less than 20% is charged under pressure of 1-100 atm. to the $SO_2$ enriched aqueous solution to produce sulfur.

However, these conventional methods using additives such as a buffer incurr the cost of the additives themselves and are also apt to produce sulfate as by-product caused by the reaction of the buffer. They also have troubles caused by contamination of the recovered elemental sulfur with the additives and therefor require treatment of the waste water which is also contaminated with the additives.

SUMMARY OF THE INVENTION

The object of the present invention is to provide a simple and effective process for the desulfurization of gases containing $H_2S$ eliminating the problems accompanied in the conventional liquid phase Claus reaction.

Another object of the present invention is to provide a selective desulfurization process for natural gas containing $H_2S$.

Another object of the present invention is to provide a selective desulfurization process for a gas containing $H_2S$ and $CO_2$.

Another object of the present invention is to provide a desulfurization process for $SO_2$-containing gas together with $H_2S$-containing gas.

Another object of the present invention is to provide a desulfurization process for $H_2S$-containing gas wherein a part of the recovered sulfur in a form of sulfur-in-water dispersion from the Clause reaction zone is burned with oxygen-containing gas to produce $SO_2$ required for the reaction, thus eliminating the need to supply $SO_2$ from outside.

Another object of the present invention is to provide a process wherein high degree desulfurization is achieved by scrubbing residual sulfur compounds in a gas with an absorbent after a greater part of $H_2S$ is eliminated from $H_2S$-containing gas with liquid phase Claus reaction.

DETAILED DESCRIPTION OF THE PREFERRED EMBODIMENTS

The inventors of the present invention studied the mechanism and the rate of reaction in the Claus reaction conducted in water in order to find proper additives to promote the Claus reaction in liquid phase. As a result, they unexpectedly found that the phenomenon recognized in the conventional studies that $H_2S$ breaks through the reaction zone without reacting with $SO_2$ charged simultaneously in water, was that for a certain period of time after the beginning of the reaction, the conversion (desulfurization rate) increased gradually when the reaction was continued in spite of such initial phenomenon.

Figure 1:
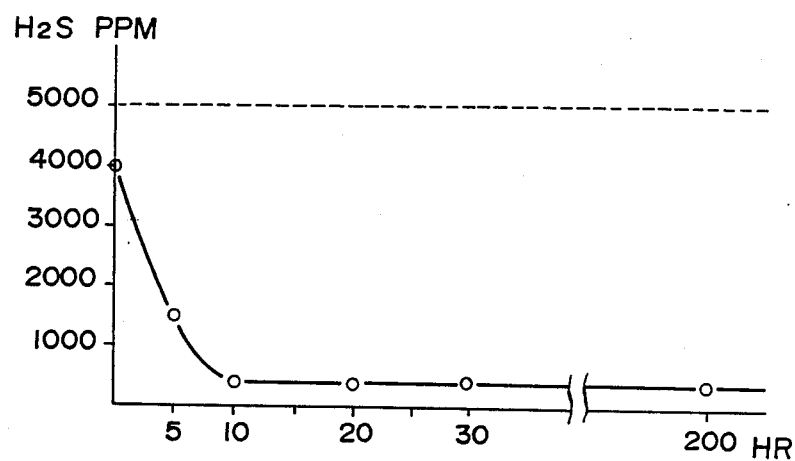
FIG. 1 shows a graph illustrating that the conversion (desulfurization rate) of $H_2S$ by the Clause reaction with water containing no additive is only about 20% at initial stage, but increases gradually with the lapse of time, and finally reaches more than 90% of the theoretical conversion after 10 hours and is maintained at the level thereafter.

The unexpected phenomenon is explained as follows referring to FIG. 1;

A gas containing 2,500 ppm of $SO_2$ and 5,000 ppm of $H_2S$ (the rest was $N_2$), was charged at a rate of 50 Nl/hr. into an absorbing reactor filled with 50 ml water and maintained at 40 $Kg/cm^2G$. Under these conditions, concentration of $H_2S$ in the outlet gas from the reactor was 4,000 ppm initially. However, the concentration of $H_2S$ in the outlet gas decreased gradually as the time passed by, finally becoming 370 ppm after 10 hrs., and maintained that level thereafter. The result of the experiment continued for 200 hrs. and did not indicate any decrease in the reaction rate.

The present invention for the desulfurization was accomplished based on the above mentioned inventive knowledge, and is characterized by conducting the Claus reaction in pressurized water substantially free from any additive for the reaction into which $H_2S$-containing gas is introduced together with gaseous $SO_2$ simultaneously and continuously.

Figure 2:
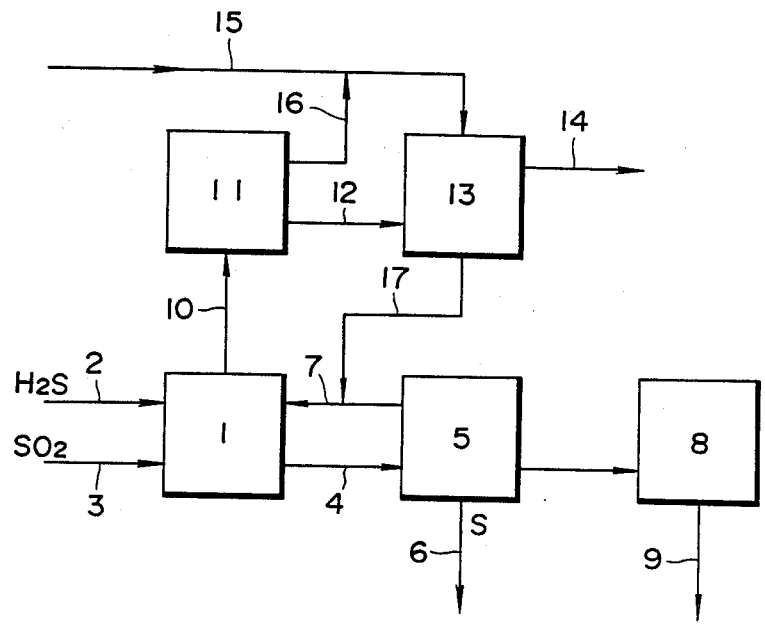
FIG. 2 shows a demonstrative flow chart of a process to put the present invention in operation.

One of the preferred embodiments of this invention is disclosed in FIG. 2.

To an Reactor 1 filled with pressurized water free from any additives, an $H_2S$-containing gas and a $SO_2$-containing gas are charged through Lines 2 and 3 respectively, and the gases are bubbled in the water under pressure. The test result shown in FIG. 1 indicates that the Claus reaction proceeds more briskly with the passage of time, and elemental sulfur formed accumulates in the Reactor 1 in a form of a sulfur-in-water dispersion. The sulfur-in-water dispersion is transferred to a Separator 5 through Line 4, and is separated there into water and sulfur. As sulfur liquefies at above around 120° C., liquid sulfur can be taken out from the bottom of the Separator 5 through line 6. Water separated from sulfur is recycled to Reactor 1 through Line 7. At the steady state, the water medium in the Reactor 1 is kept below pH 2 by the recycle of the water separated at the Separator 5. According to our observation, the Claus reaction in the present invention is most vigorous when the water medium in the reactor is below pH 2.

As the water formed with the Claus reaction or the water introduced into the system for washing of the desulfurized gas begins to accumulate in excess, the water is transferred from the Separator 5 to a Neutralizing Vessel 8 and discharged through Line 9 after neutralization. As the discharged excess water contains no additives such as the buffers used by the prior art, waste water treatment is easy. This is one of the advantages of the present invention compared to the conventional liquid phase Claus processes.

Desulfurized gas eliminated from the most of the introduced $H_2S$ is sent to a Cooler 11 through Line 10 to condensate and separate the accompanied steam, and is then charged into a Refining Tower 13 through Line 12 to be washed with water from Line 15 for removal of the remaining unreacted $H_2S$ and $SO_2$ before being discharged or recovered through Line 14.

Water separated at the Cooler 11 is combined through Line 16 with water supplied from Line 15, and the water is used for washing and then is charged through Line 17 to a Recycle Water Line 7 for the Reactor 1.

$H_2S$-containing gas and gaseous $SO_2$ can be introduced into the reactor separately through plural lines, or can be introduced through a single line as a mixture. The reactor can be composed as a multi-stage reactor.

EXAMPLE 1

For the purpose of verifying the effect of the present invention, a prescribed amount of water was filled into a stainless steel bubble-tower reactor with 27 mm inner diameter equipped with a sintered metal dispersing plate with holes having a diameter of 2 microns, and the prescribed amounts of $H_2S$—$N_2$ and $SO_2$—$N_2$ gases at 25° C. were charged through flow meters to be dispersed in the water.

Gas composition at the outlet of the reactor was analyzed with gas chromatography for gas concentrations of above 1,000 ppm of $H_2S$ or $SO_2$ and with detector tubes for concentrations of below 1,000 ppm until the gas composition became steady.

The effects of the pressure on the conversion of $H_2S$ and $SO_2$ are shown in Table 1.

TABLE 1

| pressure $Kg/cm^2G$ | $H_2S$ vol. % | $SO_2$ vol. % | $SO_2/H_2S$ mol ratio | contact time hr. | $H_2S$ conv. % | $SO_2$ conv. % | pH |
|---|---|---|---|---|---|---|---|
| 0.5 | 1.00 | 0.51 | 0.51 | 0.0017 | 59.0 | 60.0 | 2.0 |
| 5 | 1.01 | 0.51 | 0.50 | 0.0017 | 88.2 | 92.4 | 1.2 |
| 10 | 0.98 | 0.49 | 0.50 | 0.0017 | 92.9 | 96.2 | 1.0 |
| 20 | 1.02 | 0.50 | 0.49 | 0.0018 | 95.2 | 98.2 | 1.3 |
| 30 | 1.01 | 0.50 | 0.50 | 0.0018 | 97.4 | 98.6 | 1.0 |
| 40 | 1.02 | 0.52 | 0.51 | 0.0018 | 98.2 | 99.1 | 0.9 |
| 60 | 0.99 | 0.49 | 0.49 | 0.0017 | 99.7 | 99.8 | 1.1 |
| 70 | 0.98 | 0.48 | 0.49 | 0.0017 | 99.6 | 99.8 | 1.0 |
| 80 | 1.03 | 0.52 | 0.50 | 0.0017 | 99.8 | 99.9 | 0.8 |

As is obvious from Table 1, around 60% conversion of $H_2S$ and $SO_2$ was achieved even at a low system pressure as 0.5 $Kg/cm^2G$, and about 90% conversion was achieved when the pressure was 5 $Kg/cm^2G$. At 40 $kg/cm^2G$ pressure, conversion of $H_2S$ and $SO_2$ became above 98%, and they reached above 99% at 60-80 $Kg/cm^2G$ pressure.

The pressure for a specific conversion could be lowered when the concentration of $H_2S$ and $SO_2$ in the gases to be treated is higher. However, when the purity of the desulfurized gas to be attained is important, it is preferable to set the lower limit of the pressure at above 5 $Kg/cm^2G$ where remarkable effects of pressure are recognized as shown in Table 1.

The Claus reaction according to the present invention may be carried out at a high acidic condition below pH 2 but usually at pH 1.5–0.1, because of the absence of buffer.

In the conventional methods, it has been thought that the liquid phase Claus reaction should not be carried out at such a low pH condition because the solubility of $SO_2$ decreases.

However, for the reasons of (1) the reaction rate is rather higher at low pH condition; (2) the solubility of $H_2S$ and $SO_2$ increases at pressurized condition; and (3) as $H_2S$ and $SO_2$ are introduced simultaneously and continuously, the reaction (that is, consumption) of them proceeds in keeping pace with the absorption to serve as a driving force to each other for more absorption and reaction; it is thought that the total reaction rate is maintained at a high level.

EXAMPLE 2

The same method as Example 1 was used. The effects of the $SO_2/H_2S$ mol ratio on conversion of $H_2S$ and $SO_2$ are shown in Table 2.

TABLE 2

| pressure $Kg/cm^2G$ | $H_2S$ vol. % | $SO_2$ vol. % | $SO_2/H_2S$ mol ratio | contact time hr. | $H_2S$ conv. % | $SO_2$ conv. % | pH |
|---|---|---|---|---|---|---|---|
| 40 | 1.00 | 0.40 | 0.40 | 0.0017 | 93.2 | ≈100 | 1.2 |
| 40 | 0.99 | 0.47 | 0.47 | 0.0017 | 95.8 | 99.4 | 1.1 |
| 40 | 1.02 | 0.52 | 0.51 | 0.0018 | 98.2 | 99.1 | 0.9 |
| 40 | 1.01 | 0.58 | 0.57 | 0.0017 | 99.1 | 70.6 | 1.1 |
| 40 | 1.02 | 0.79 | 0.77 | 0.0018 | 99.8 | 65.1 | 1.1 |
| 40 | 1.02 | 0.99 | 0.97 | 0.0017 | ≈100 | 50.4 | 1.1 |

As to the $SO_2/H_2S$ mol ratio to be charged, almost perfect conversion was achieved at around the stoichiometric value, namely 0.5 for the Claus reaction.

Accordingly, the ratio is preferably set in the range of 0.4–0.6 usually. However, in some cases, to comply with the operating conditions of combined processes, $SO_2/H_2S$ ratio may intentionally be changed from the theoretical value 0.5 to remove more completely one component and cause another component to remain.

EXAMPLE 3

The same method as Example 1 was used. The effects of the contact time on conversions of $H_2S$ and $SO_2$ are shown in Table 3.

TABLE 3

| pressure $Kg/cm^2G$ | $H_2S$ vol. % | $SO_2$ vol. % | $SO_2/H_2S$ mol ratio | contact time hr. | $H_2S$ conv. % | $SO_2$ conv. % | pH |
|---|---|---|---|---|---|---|---|
| 40 | 0.30 | 0.18 | 0.60 | 0.01 | ≈100 | 83.3 | 1.1 |
| 40 | 0.29 | 0.18 | 0.62 | 0.003 | ≈100 | 80.6 | 1.2 |
| 40 | 0.30 | 0.18 | 0.60 | 0.0017 | 97.0 | 80.4 | 1.1 |

As for the contact times, 0.003 hr. (10.8 sec.) was enough for the reaction, and an excellent conversion was achieved even when the cntact time was 0.0017 hr. (6.1 sec.) if optimum pressures and $SO_2/H_2$mol ratios were chosen, as are clear from Tables 1 and 2.

EXAMPLE 4

The same method as Example 1 was used. The effects of the reaction temperature on conversions of $H_2S$ and $SO_2$ are shown in Table 4.

TABLE 4

| pressure $Kg/cm^2G$ | temp. °C. | $H_2S$ vol. % | $SO_2/H_2S$ mol ratio | contact time hr. | $H_2S$ conv. % | $SO_2$ conv. % | pH |
|---|---|---|---|---|---|---|---|
| 40 | 50 | 0.30 | 0.60 | 0.003 | 97.5 | 87.6 | 1.1 |
| 40 | 97–100 | 0.29 | 0.63 | 0.003 | 96.0 | 86.5 | 1.2 |
| 40 | 128–130 | 0.30 | 0.60 | 0.003 | 96.0 | 86.0 | 1.1 |
| 40 | 151 | 0.30 | 0.60 | 0.003 | 95.4 | 87.0 | 1.2 |

As is clear from Table 4, the reaction temperatures little affected the conversion.

So, the operation is preferably performed at an ambient temperature to 160° C.

When the reaction is maintained at above 120° C., sulfur formed is liquefied and can be separated in the Reactor without installation of an independent separator.

As can be understood from Example 3, the present invention accomplishes a high conversion of nearly 100% even when the concentration of the raw gases is as low as 0.3% (3,000 ppm) for $H_2S$.

Figure 3:
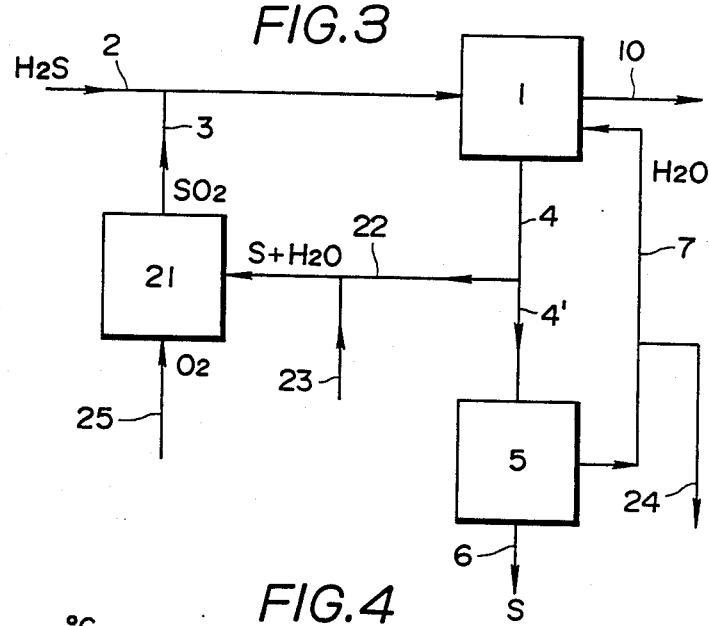
FIG. 3 shows a flow chart of another process in which $SO_2$ produced by the combustion of a sulfur-in-water dispersion formed by the liquid phase Clause reaction according to the present invention is used to react with $H_2S$ in the Claus reaction.
Figure 4:
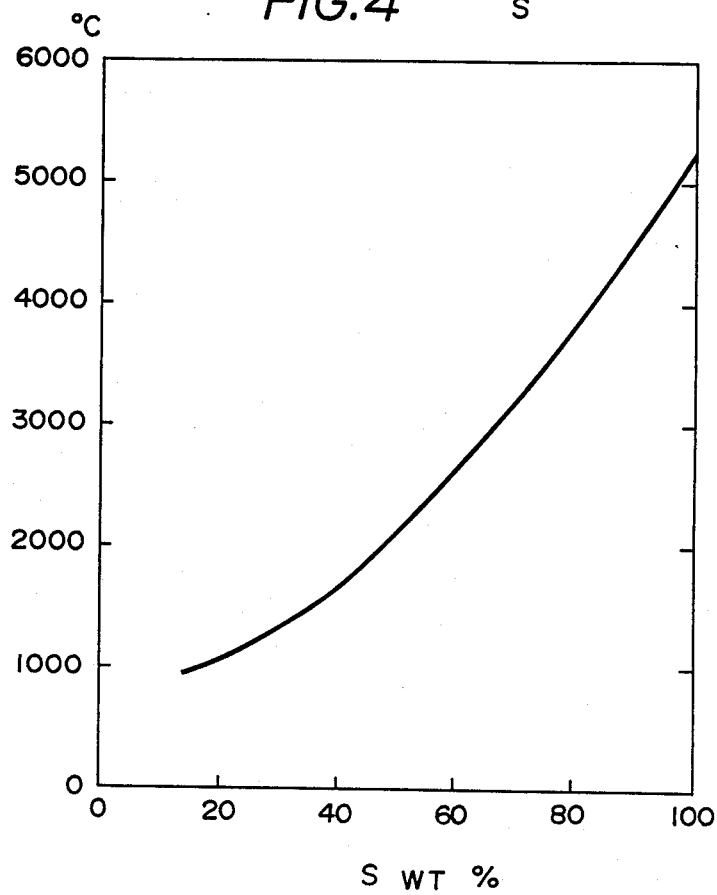
FIG. 4 shows a graph illustrating the relation between the sulfur content in a sulfur-in-water dispersion and the combustion temperature of the dispersion.

A preferable application of the present invention is explained with FIG. 3 and FIG. 4.

For the desulfurization of a $H_2S$-containing gas, $SO_2$ required for the reactor can be supplied as $SO_2$ gas produced by the combustion of a part of the recovered sulfur in a form of sulfur-in-water dispersion from the Claus reaction zone with oxygen-containing gas, keeping the combustion temperature below 2000° C. by adjusting the sulfur content in the sulfur-in-water dispersion. The latent heat of vaporization of the accompanied water serves to lower the combustion temperature of sulfur.

FIG. 3 shows a flow chart for the desulfurization of natural gas containing $H_2S$.

$SO_2$ gas from a Sulfur Combustion Furnace 21 through Line 3 is added to $H_2S$-containing natural gas flowing in Line 2. The mixed gas has its temperature controlled by a heat exchanger etc., and is then introduced into a Reactor 1 filled with pressurized water. In the reactor, the Claus reaction of $H_2S$ and $SO_2$ proceeds to form elemental sulfur, and thus desulfurized natural gas having most of the $H_2S$ removed, is discharged from Line 10.

The formed elemental sulfur is discharged from the Reactor with water in a form of sulfur-in-water dispersion, and introduced in Sulfur Separator 5 through Lines 4 and 4'. The sulfur-in-water dispersion is heated there to a temperature higher than 120° C. to liquefy the sulfur, and sulfur and water are separated to two liquid phases. The water phase is recycled to the Reactor 1 through Line 7, and the liquefied sulfur is recovered through Line 6.

A part (A quantity enough to produce $SO_2$ necessary to be reacted with $H_2S$ contained in the natural gas) of the sulfur-in-water dispersion discharged from the Reactor 1 is divided from Line 4 to Line 22, regulating the water content by addition of fresh water from Line 23, or by discharging through Line 24 the recycled water to the Reactor through Line 7, and then introduced in the Sulfur Combustion Furnace 21, where the sulfur is burned with oxygen-enriched gas from Line 25, preferably under a slightly insufficient oxygen condition to prevent the formation of $SO_3$. The produced $SO_2$ is added to the natural gas in order to react in the Reactor.

In the above described process, it is important to regulate the sulfur content of the sulfur-in-water dispersion to maintain the combustion temperature of the dispersion at 1000°–2000° C., preferably at 1000°–1500° C.

Here, the "oxygen-enriched gas" means a gas containing oxygen, the concentration of which is more than that of the air. For example, such gas includes high purity oxygen (99.5% or higher) from air separator and a high content oxygen gas mixture (90% or higher) obtained from PSA (Pressure Swing Adsorption) method or from membrane separation apparatus. The lower concentration oxygen-enriched gas, for example, 30% oxygen gas can also be used.

FIG. 4 shows a graph illustrating the relation between the sulfur content (expressed on X axis) in sulfur-in-water dispersions and the combustion temperature (expressed on Y axis) of the dispersions when burned with pure oxygen.

From FIG. 4, it is observed that the sulfur content in the sulfur-in-water dispersion must be about 50% in order to keep the combustion temperature at 2000° C., and the sulfur content in the sulfur-in-water dispersion must be about 35% in order to keep the combustion temperature at 1500° C. Though FIG. 4 shows a case in which pure oxygen is used for combustion, when oxygen-enriched gas with a relatively low oxygen concentration is used, a higher sulfur concentration dispersion can be used to keep the same combustion temperature.

The operation pressure of the Sulfur Combustion Furnace is not specified, however, it is convenient to operate at about 5–100 Kg/cm$^2$ G to comply with the operating pressure of the Claus reactor.

High concentration $SO_2$ produced by the combustion of sulfur with oxygen enriched gas is useful because the contamination by nitrogen of desulfurized gas may be lowered, compared to the case where the air is employed as combustion gas.

It is necessary to burn sulfur with oxygen-enriched gas in order to produce high concentration $SO_2$, but on the other hand, when such oxygen-enriched gas is employed as combustion gas without the existence of water, it is considered that the combustion temperature will reach as high as 5000° C. as shown in FIG. 4, and the difficulty for selection of the material for construction of the Sulfur Combustion Furnace is caused. In an embodiment of the present invention, this problem may easily be solved because the sulfur is obtained as the sulfur-in-water dispersion as intermediate product of the process and can be burned as it is.

If the contamination of nitrogen in the desulfurized gas is allowed, or if nitrogen as a contaminant can be removed at the next step process such as the liquefaction process of natural gas, air may be used as combustion gas of the sulfur-in-water dispersion.

As the sulfur-in-water dispersion to be burnt does not contain any additives, there is with problem on combustion operation and with the purity of the produced $SO_2$, and $SO_4^{2-}$ which is produced at the Reactor, as by-products are fortunately decomposed at the Sulfur Combustion Furnace.

EXAMPLE 5

Figure 5:
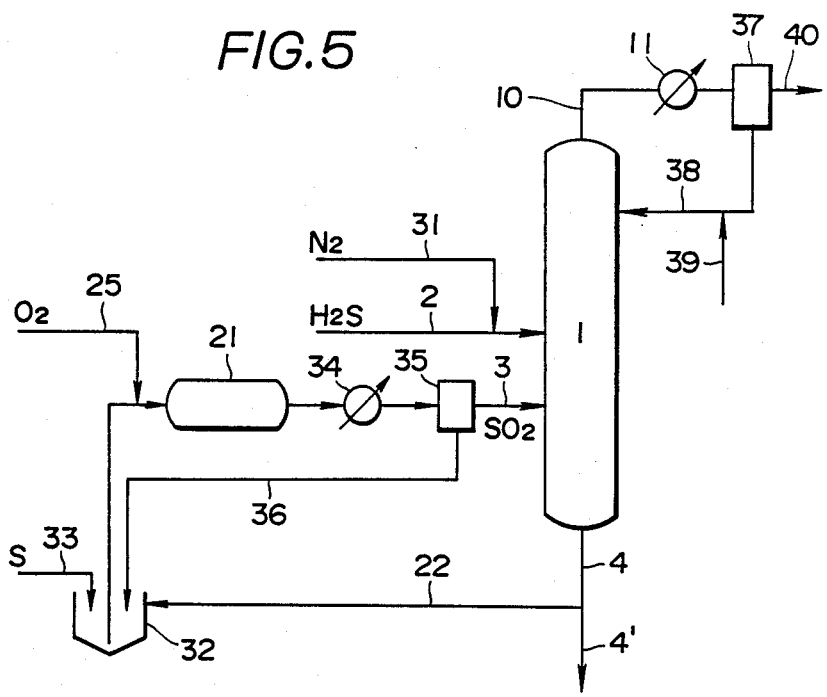
FIG. 5 shows a flow chart of a preferable process according to the present invention used in Example 5.

As is shown in FIG. 5, a 10.23 cm inner diameter and 4 m height stainless steel Reactor 1 was charged with 21 Nm$^3$/hr. compressed $N_2$ from Line 31 to hold 30 Kg/cm$^2$G, then filled with 24 liter water and heated to 120° C.

Elemental sulfur from outside was provided into a Slurry Preparator 32 via Line 33, and 30 wt.% sulfur-water slurry was prepared as $SO_2$ source. The prepared 30 wt.% sulfur-water slurry was charged in a Sulfur Combustion Furnace 21 at the rate of 1.0 Kg/hr. and burned with oxygen at the rate of 0.21 Nm$^3$/hr. from line 25 to prepare $SO_2$. The combustion temperature never exceeded 1500° C.

The produced $SO_2$ was cooled to 120° C. at a Cooler 34, separated from the condensed water at a Separator 35, then introduced in the Reactor 1 through Line 3 after being compressed to 40 Kg/cm$_2$G. The separated water at the Separator 35 was recycled to the Slurry preparator 32 through Line 36.

When the $SO_2$ content of the outlet gas from the Reactor reached 1000 ppm, $H_2S$ from Line 2 was added to $N_2$ in Line 31 to give the concentration of 20,000 ppm in $N_2$, and then introduced into the Reactor to cause the Claus reaction with $SO_2$.

The reaction temperature was 120° C., the reaction pressure was 30 Kg/cm$^2$G, and the contact time was 0.024 hr. (86.4 sec.).

The outlet gas from the Reactor 1 from Line 10 was cooled to 40° C. at a Cooler 11, separated from the condensed water at a Separator 37 and discharged through Line 40. The separated water was recycled to the Reactor through Line 38.

From the bottom of the Reactor 1, a 60 wt.% sulfur-in-water dispersion was taken out through Line 4 at the rate of 1490 g/hr., and 500 g/hr. of which was introduced into the Slurry Preparator 32 through Line 22. The rest of the sulfur-in-water dispersion was discharged through Line 4'. Finally, 260 g/hr. water was supplied to this system through Line 39 to keep the water balance.

The operation was continued for 100 hrs., and the composition of the outlet gas from the Reactor 1 was that $H_2S$ was 0 ppm at the initial stage and $SO_2$ showed a gradual decrease. After 3 hrs. 3 ppm $H_2S$ was detected, then increased gradually to 35 ppm to maintain that value steadily. $SO_2$ concentration at the steady state was 21 ppm.

Another preferable desulfurization system utilizing the present invention is explained next.

A greater part of $H_2S$ contained in natural gas etc. is eliminated as elemental sulfur according to the present invention, but a small amount of $H_2S$ and/or $SO_2$ and organic sulfur compounds remain in the desulfurized gas by the liquid phase Claus reaction.

Therefore, if highly desulfurized gas is required, it is recommended that a finishing process be combined with the Claus reaction process.

According to the inventor's observations, in the liquid phase Claus reaction, either component of $H_2S$ or $SO_2$ proceeds to almost complete reaction, in general, where it is less than the other in the stoichiometric ratio, ($H_2S/SO_2$) of 2.

So, it is advisable to intentionally prepare the reactants so that either of $H_2S$ or $SO_2$ exists in a smaller amount compared to another component to be subjected to reaction and then to eliminate the excess of the component which has not taken part in the reaction, in a finishing process, for example, scrubbing. Which component is to be adjusted to a smaller amount depends on the composition of the gas to be applied and the degree of desulfurization required.

The finishing process that aims to eliminate the remaining $H_2S$ may be optionally selected from an amine absorption process, physical absorption process, physical-chemical absorption process or the like. A finalizing process which that aims to eliminate the remainind $SO_2$ may be selected from $NH_3$, NaOH washing process or the like.

Combination of any one of these finishing process and the desulfurization process of the present invention not only contributes to more advanced $H_2S$ removal but also makes it possible to allot the desulfurization load to each process arbitrarily in order to minimize the operation cost.

Figure 6:
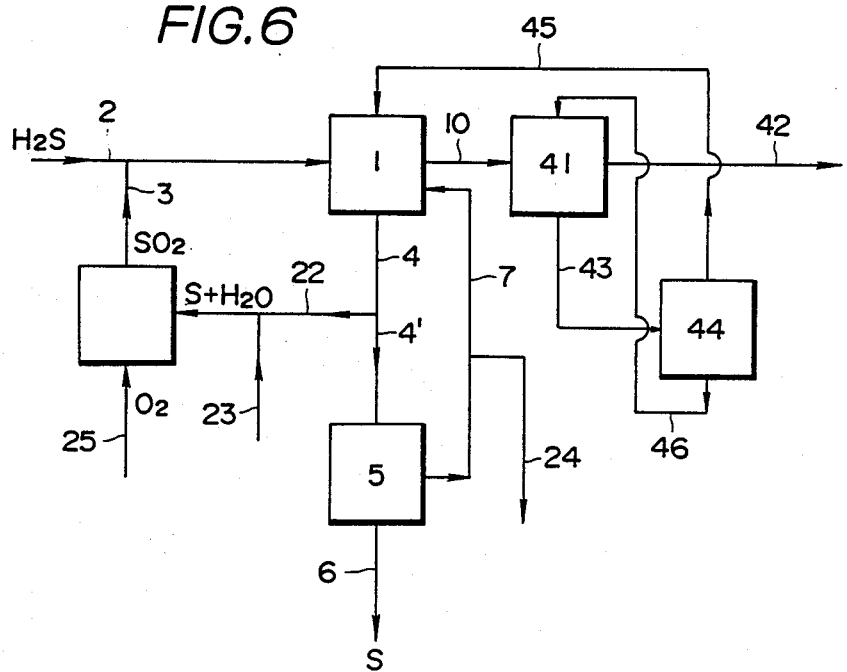
FIG. 6 shows a flow chart for a more preferable desulfurization process in which the present invention is combined with the conventional desulfurization process.

FIG. 6 shows an example of the combination system by adding a finishing process to the process shown in FIG. 3.

The liquid phase Claus reaction part in FIG. 6 is the same as one explained according to FIG. 3. The natural gas from Line 10, which is eliminated from the greater part of $H_2S$, is introduced into an Acid Gas Absorption Tower 41, and remaining $H_2S$ and organic sulfur compounds in the gas are absorbed with physical-chemical aqueous absorbent (or any other solvent) from Line 46.

The absorbent is then introduced to a Regenerator 44 through Line 43 and the absorbed acid gas component is desorbed here. The desorbed gas component is recycled to the Reactor 1 through Line 45. When the desorbed gas contains $H_2S$, it can be recycled to the Sulfur Combustion Furnace 21 to be oxidized to $SO_2$.

The aqueous absorbent separated from an acid gas component is recycled to the Acid Gas Absorption Tower 41 through Line 46.

The natural gas which is highly desulfurized by the finishing process is obtained from Line 42.

EXAMPLE 6

According to the flow chart shown in FIG. 6, natural gas containing 1 vol.% $H_2S$ at 40 Kg/cm$^2$G is introduced into a Reactor 1 from Line 2 at the rate of 10,000 Kmol/hr. together with $SO_2$ from Line 3 at the rate of 42.92 Kmol/hr. that corresponds to $SO_2/H_2S$ mol ratio 0.4 to the total $H_2S$ from Line 2 and Line 45.

In this case, $H_2S$ conversion is about 93.2% and $SO_2$ conversion is 100% as shown in Table 2. In the discharged gas in Line 10, 7.3 Kmol/hr. $H_2S$ remains but no $SO_2$ is detected.

Elemental sulfur which is discharged through Line 4 is 142.92 Kmol(as $S_1$)/hr. and 100 Kmol/hr. of which is recovered from Line 6. Remaining 42.92 Kmol/hr. sulfur is transferred to the Sulfur Combustion Furnace 21 through Line 22 and burnt with oxygen to produce $SO_2$ to be recycled to the Reactor 1 through Line 3.

The natural gas in Line 10 which contains remaining 7.3 Kmol/hr. $H_2S$ is contacted with amine solution in the Absorption Tower 41 and withdrawn from Line 42. The $H_2S$ content in the gas becomes below 5 ppm.

The amine solution is transferred from the Absorption Tower 41 to the Regenerator 44 through Line 43 to strip the absorbed $H_2S$ and the regenerated amine solution is recycled to Absorption Tower 41 through Line 46. The stripped $H_2S$ is recycled to the Reactor 1 through line 45.

As described above in detail, the desulfurization process according to the present invention may eliminate $H_2S$ from $H_2S$-containing raw gases by a liquid phase Claus reaction with $SO_2$ to convert the $H_2S$ to elemental sulfur, highly selectively comparing to the conventional gas phase process.

Therefore, the process according to the present invention may be profitable particularly for desulfurization of synthesis gas for methanol which contains $CO_2$ as a carbon source in raw materials because $CO_2$ does not take part in the Claus reaction and is not lost or consumed.

When applied to natural gas or other hydrocarbons containing $H_2S$, the gas phase Claus reaction is apt to burn a part of the hydrocarbons with oxygen accompanied with $SO_2$. On the contrary, the process according to the present invention does not burn hydrocarbons.

Compared to the conventional liquid phase Claus reaction using an additive such as buffer, the present invention does not need the cost of the additive and makes the treatment of the discharged water easy, because it is not contaminated with the additive.

The present invention is also preferably applied to (1) Partial oxidation gas of heavy oil or coal and (2) Off gas from petroleum refining processes.

The features of the present invention are as follows:
(1) With the one step of simple treatment, $H_2S$ and $SO_2$ can be reduced to below 1000 ppm.
(2) Only $H_2S$ is selectively eliminated with higher efficiency for gases containing $H_2S$ and $CO_2$.
(3) Only water is used as the reaction medium and no additive such as buffer is required for the promotion of the Claus reaction, the operation cost is expected to be low.
(4) Using sulfur-in-water dispersion produced by the Claus reaction, even if oxygen enriched gas is employed to produce high concentration $SO_2$, the flame temperature at the combustion furnace is significantly reduced and the combustion furnace can be constructed with ordinarily available materials.
(5) With the utilization of the high concentration $SO_2$ produced by the above mentioned method, contamination with $N_2$ to the desulfurized gas is repressed. Therefore, the desulfurization of natural gas can be performed rationally and economically.
(6) As the discharged water from the process contains no additive, the waste water treatment is easy.

We claim:
1. A process for the desulfurization of gas containing hydrogen sulfide comprising:
(a) introducing the gas containing hydrogen sulfide together with a gas containing sulfur dioxide simultaneously and continuously into a water medium free from any additive and pressurized at a pressure of 10 Kg/cm$^2$ gauge or higher in a reactor having no mechanical agitating means until the pH of the water medium falls in a range of 0.1 to below 2.0; and
(b) continuing the simultaneous introduction of the gas containing hydrogen sulfide and the gas containing sulfur dioxide into said water medium having a pH in a range of 0.1 to below 2.0, and subjecting the resulting medium to liquid phase Clause reaction to form elemental sulfur in a form of sulfur-in-water dispersion.

2. A process for the desulfurization of gas containing hydrogen sulfide according to claim 1, wherein the pressure is 10–80 Kg/cm$^2$ gauge.

3. A process for the desulfurization of gas containing hydrogen sulfide according to claim 1, wherein the length of contact time of the gases in the water medium are shorter than 0.024 hr.

4. A process for the desulfurization of gas containing hydrogen sulfide according to claim 1, wherein the sulfur-in-water dispersion from the liquid phase Claus reaction zone is subjected to separation into sulfur phase and water phase, the water phase being recycled to the reaction zone so as to maintain the water medium for the liquid phase Claus reaction below pH 2.

5. A process for the desulfurization of gas containing hydrogen sulfide according to claim 1, wherein a part of the sulfur in a form of sulfur-in-water dispersion is burned with oxygen-containing gas to generate sulfur dioxide, keeping the combustion temperature below 2000° C. by adjusting the water content of the sulfur-in-water dispersion and then the generated sulfur dioxide is provided to the liquid phase Claus reaction.

6. A process for the desulfurization of gas containing hydrogen sulfide according to claim 1, wherein the liquid phase Claus reaction is conducted at a temperature over 120° C. to recover sulfur in a form of molten state.

7. A process for the desulfurization of gas containing hydrogen sulfide according to claim 1, wherein the amount of either hydrogen sulfide or sulfur dioxide being introduced into the pressurized water is adjusted so that it exists in an excess amount compared to the other component regarding the stoichiometric relation of the Claus reaction and then the component in excess which has not taken part in the reaction is eliminated in a finishing process.

8. A process for the desulfurization of gas containing hydrogen sulfide according to claim 7, wherein the component existing in an excess amount is hydrogen sulfide, and the component to be eliminated in the finishing process is hydrogen sulfide.

9. A process for the desulfurization of gas containing hydrogen sulfide according to claim 7, wherein the component existing in an excess amount is sulfur dioxide and the component to be eliminated in the finishing process is sulfur dioxide.

* * * * *